April 23, 1968     N. ROSENSTEIN     3,379,002
SPLICED YARN

Filed Feb. 24, 1967     7 Sheets-Sheet 1

INVENTOR.
NATHAN ROSENSTEIN
BY
Paul + Paul
ATTORNEYS.

April 23, 1968 N. ROSENSTEIN 3,379,002
SPLICED YARN
Filed Feb. 24, 1967 7 Sheets-Sheet 2
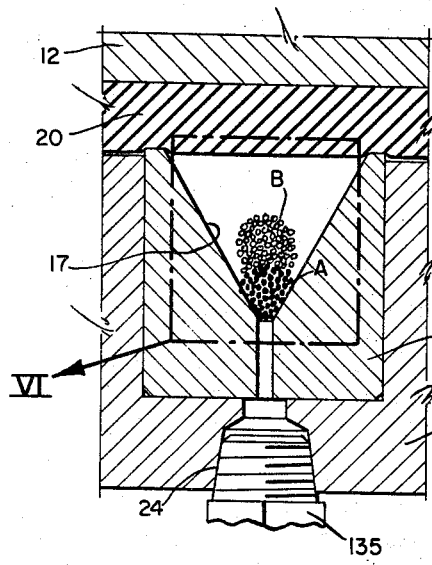
Fig. 5
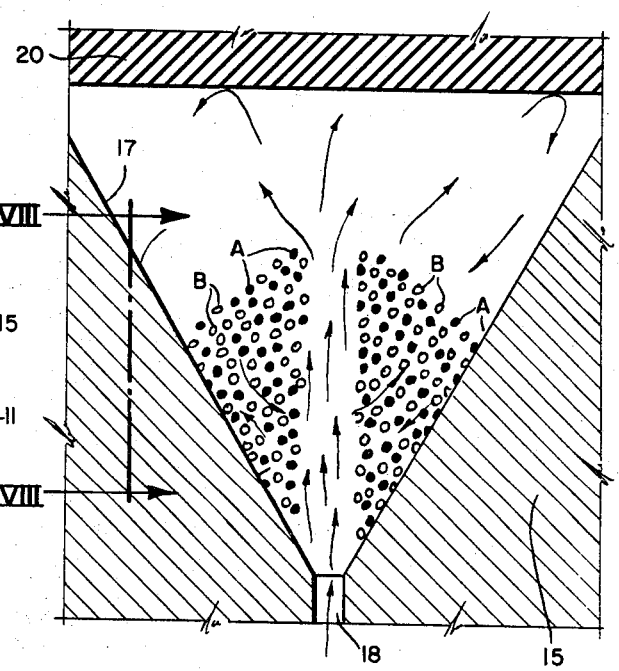
Fig. 6
Fig. 7
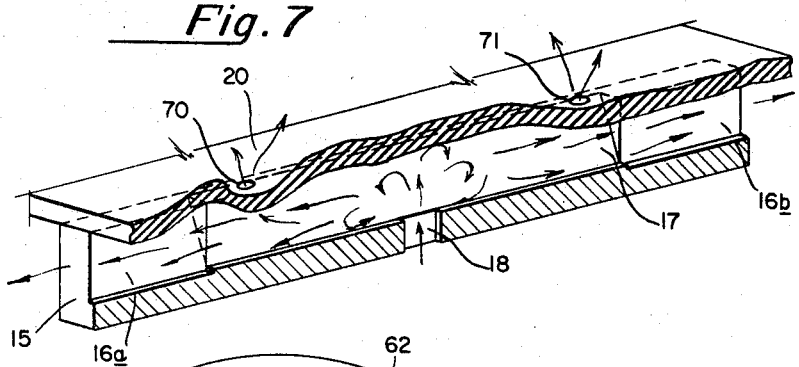
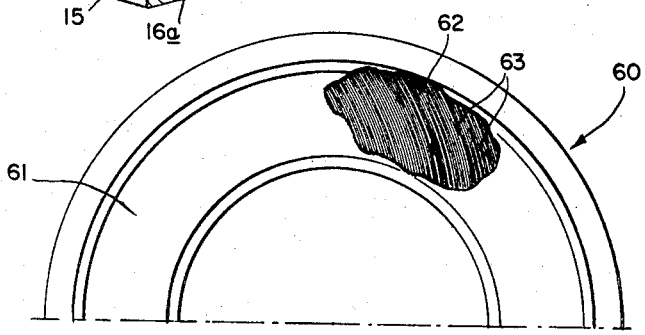
Fig. 10
INVENTOR.
NATHAN ROSENSTEIN
BY
Paul + Paul
ATTORNEYS.

April 23, 1968    N. ROSENSTEIN    3,379,002
SPLICED YARN

Filed Feb. 24, 1967    7 Sheets-Sheet 3

INVENTOR.
NATHAN ROSENSTEIN
BY
Paul & Paul
ATTORNEYS.

April 23, 1968     N. ROSENSTEIN     3,379,002
SPLICED YARN

Filed Feb. 24, 1967     7 Sheets-Sheet 6

INVENTOR.
NATHAN ROSENSTEIN
BY
Paul + Paul
ATTORNEYS.

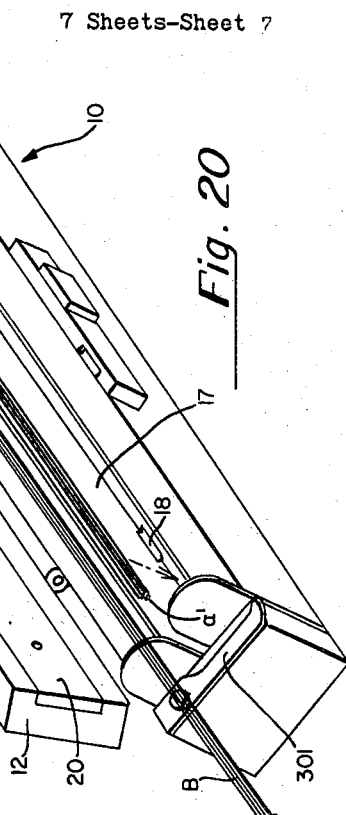
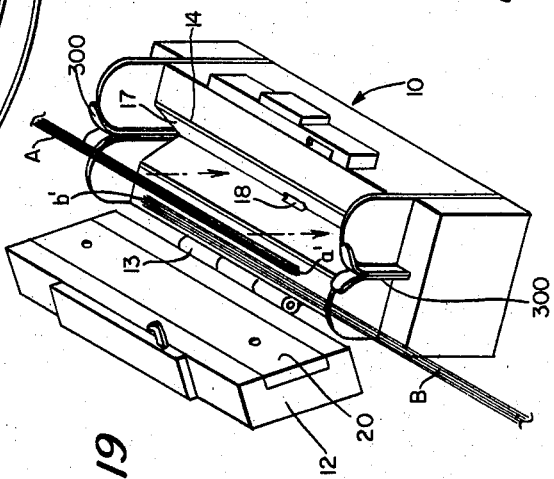

United States Patent Office 3,379,002
Patented Apr. 23, 1968

3,379,002
SPLICED YARN
Nathan Rosenstein, West Hartford, Conn., assignor to Spunize Company of America, Inc., Unionville, Conn., a corporation of Connecticut
Continuation-in-part of application Ser. No. 562,623, July 5, 1966. This application Feb. 24, 1967, Ser. No. 618,507
6 Claims. (Cl. 57—142)

ABSTRACT OF THE DISCLOSURE

The disclosed slice for two multi-filament yarns embodies spaced apart areas in which the filaments on one yarn are entangled with those of the other. At an intermediate point or points in the zone of entanglement, the filaments of the joined yarns are wedged apart and separated by a central air space.

*Cross-references to related applications*

Reference is made to U.S. application Ser. No. 562,623, filed July 5, 1966, now U.S. Patent No. 3,306,020, of which this is a continuation-in-part.

*Background of invention*

Heretofore, splices have been made by blowing air upon overlapping ends of yarn while the ends of yarn are held under tension in order to prevent any twisting of one yarn with respect to the other. The air has been blown substantially parallel to the axes of the yarns, and so far as I am aware the prior art does not disclose the concept of projecting a shaft of gas through a mass of overlapping yarns to form an opening between them, and then passing the gas generally axially in a manner to cause substantial entanglement, twisting and braiding the free ends of yarn about to be joined which are not held under tension against twisting.

*Summary of invention*

This invention provides a highly effective and tenaciously adherent splice which joins two multi-filament yarns, in which the filaments of one yarn are entangled with those of the other throughout a zone which extends in both axial directions from an intermediate point, and wherein at said intermediate point the filaments of the two yarns are wedged apart. In a preferred form of the invention, the splice includes an open space generally centrally located, around which filaments of both yarns extend, and beyond which the filaments of both yarns are entangled with one another forming connections at both sides of this opening. Preferably, the free ends of the filaments are entangled in such a manner that no end-trimming is necessary.

Accordingly, it is an object of this invention to produce a splice which is strong, needs no trimming, but is small enough in axial diameter or denier to pass through the nip of feed rolls for crimpers, reed guides, creel guides, knitting machine guides, tufting machine guides and the like without crushing, breaking apart or slubbing.

Another purpose is to provide a yarn splice which is particularly suitable for use in the manufacture of tire cord fabrics, high pressure hoses, and other goods where yarn splices of high breaking strength are required.

Other objects and advantages of this invention will further become apparent hereinafter, and from the drawings.

*Brief description of the drawings*

In FIG. 1, the box is shown open, with the replaceable splicing chamber insert shown above the open box. The two ends of yarn which are to be spliced are also shown;

FIG. 5 is a view in section generally similar to FIG. 4 but showing the two yarns in place and the box lid closed;

FIG. 6 is an enlarged view of that portion of FIG. 5 within the dot-and-dash rectangle VI. In FIG. 6, the arrows indicate the flow of the compressed air;

FIG. 7 is a fragmentary view of the splicing chamber. The flow of the compressed air is indicated by the arrows;

FIG. 10 is a diagrammatic illustration of a tire showing the rubber broken away to reveal the cord fabric having yarn splices of the present invention;

FIGS. 19 and 20 are two preferred embodiments each illustrating the placement of the free ends of the yarns for making a splice where the end portions of the joint need no trimming or cutting off; and FIG. 21 is a view similar to FIG. 9, showing the preferred spliced product which is achieved in integral fashion so that the end portions of the joint need no trimming or cutting off.

Figure 1:
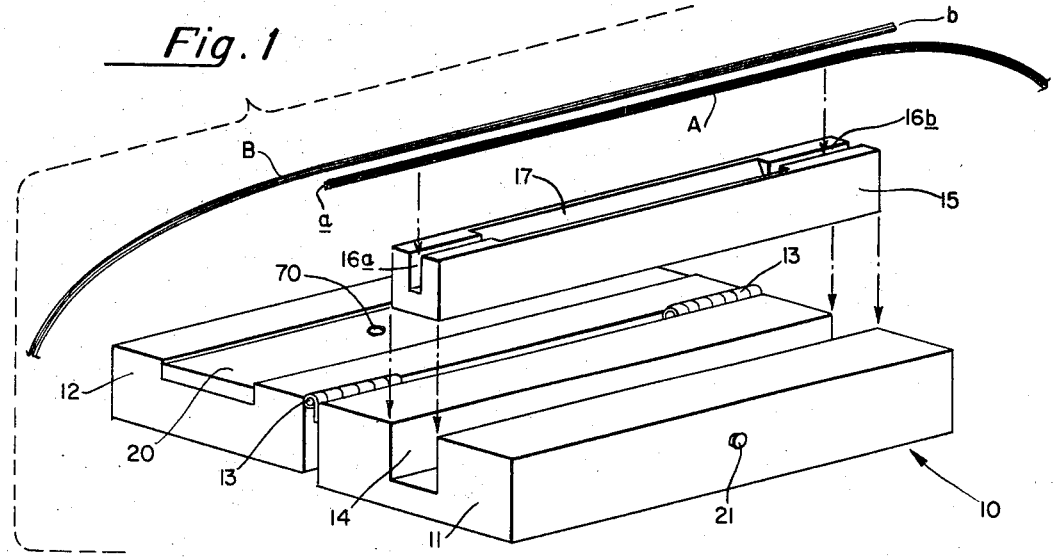
FIG. 1 is a perspective illustration of a splicing box used in making the splice of the present invention.
Figure 2:
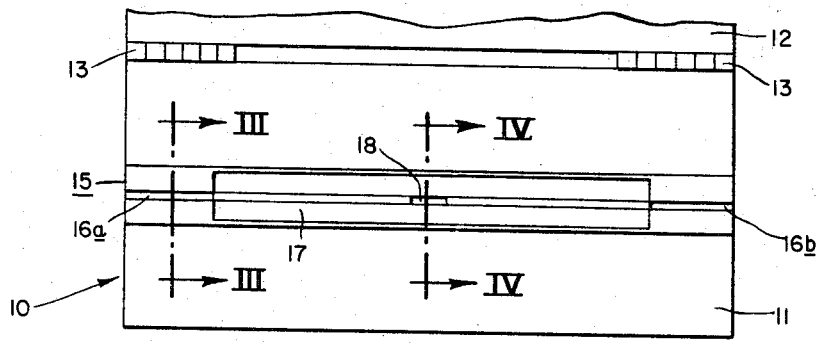
FIG. 2 is a top plan view of the base portion of the open splicing box.

The box 10 is illustrated in FIGS. 1–7 as an elongated rectangular box, which may preferably but not necessarily be of aluminum, having a lower half or base 11 and an upper half or lid 12. The lid 12 is pivotally connected to the base 11 at the rear wall, as by hinges 13, to allow the box to be fully opened and closed. A hook on the front wall of the lid 12, not visible in the drawings, hooks about the stud 21 on the front wall of the base for latching the box in closed position after the yarn ends to be spliced have been inserted therein, and before the compressed air is applied.

The base 11 is provided with an elongated rectangular channel 14 which extends the full length of the base 11. Into channel 14 a removable insert 15 is inserted. Insert 15 has a narrow rectangular notch at each end, identified as 16a and 16b. The central portion of insert 15 is cut out forming a splicing chamber 17. In FIGS. 1–7 of the drawings, splicing chamber 17 is shown to have a V-shaped cross-section with a flattened tip, but other cross-sectional shapes may be used. In FIGS. 1–7, the flat tip which forms the floor of the splicing chamber 17 is shown as raised slightly above the floors of the rectangular notches 16a and 16b, but this is not an essential feature. Insert 15 is made removable so that it may be replaced with another insert having different size notches, and/or a different size and/or shape or splicing chamber, and/or a different size of air injection slot, to accommodate different sizes of yarns.

An air injection slot 18 extends vertically through the insert 15 from its undersurface to the flat tip of the splicing chamber 17. Slot 18 extends coaxially. Its length is short, relative to the length of the splicing chamber 17, and its width is narrow relative to its length. In the drawings, air injection slot 18 is shown as having a width equal to that of the flat-tip floor of chamber 17. In a typical case, the length of the air injection slot may be $\frac{5}{32}$ inch, and its width may be $\frac{1}{32}$ inch.

Figure 3:
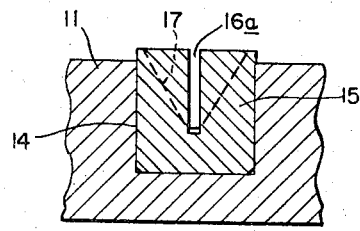
FIG. 3 is a view in section of the base, near the end thereof, looking along the line III—III in FIG. 2.
Figure 4:
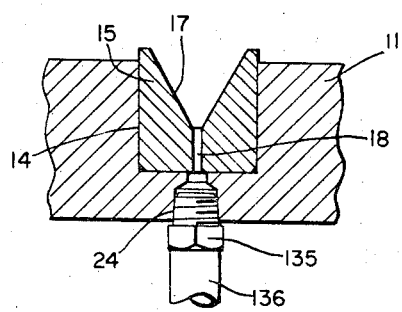
FIG. 4 is a view in section of the center part of the base looking along the line IV—IV of FIG. 2, showing the air slot.

The lid 12 of the box 10 has a central cutout portion on its undersurface into which is inserted a gasket 20 of rubber or other suitable resilient air-sealing material. When the insert 15 is inserted in the channel 14 in base 11, the upper edges of the insert 15 project somewhat above the upper surface of the base 11, as seen in FIGS. 3, 4 and 5. Thus, when the lid 12 is closed, the gasket 20 is compressed by the projecting edges of the insert 15, as seen in FIG. 5, and, except for the air escape holes 70 and 71, a good air seal is effected. Two air escape holes 70 and 71 are provided in the lid, one near each end of the splicing chamber 17. These escape holes extend through the lid 12 and gasket 20.

As indicated in FIGS. 4 and 5, a tapped hole 24 is provided in the underside of the base 11 at its center point for receiving the externally threaded connector 135 to which is attached a flexible hose 136 through which compressed air is applied. The tapped hole 24 communicates with the air injection slot 18 in the insert 15.

The manner in which the splicing box 10 illustrated in FIGS. 1–7 is used to air splice together two multi-filament yarns such as polypropylene or polyester or other continuous filament fibers, will now be described.

In FIG. 1, a multi-filament yarn A is to be spliced to a multi-filament yarn B. For convenience of identification in FIGS. 5 and 6, yarn A will be illustrated as consisting of black filaments and yarn B will be illustrated as consisting of white filaments. In FIG. 1, the terminal end of yarn A is identified by the letter a. The yarn A continues to the right for a considerable length beyond the right edge of the drawing. Similarly, the terminal end of yarn B is identified as b. Yarn B continues to the left for a considerable length beyond the edge of the drawing. Insert 15, which for purposes of illustration is shown in FIG. 1 raised above the base 11 of the splicing box 10, is inserted into the channel 14 and assumes the position shown in cross-section in FIGS. 3 and 4. Yarn A is first spread across the insert 15 and laid in the notches 16a and 16b. The terminal end a of yarn A extends slightly beyond the left edge of the base 11 of splicing box 10. Next, yarn B is spread across insert 15 and laid in the notches 16a and 16b on top of yarn A in superposed overlapping relation with its terminal end b extending slightly beyond the right edge of the base 11 of the splicing box. The yarn diameter of each of the superposed yarns is slightly smaller than the width of the notches so that the two yarns A and B may be easily held in superposed position by the vertical walls of the notches. In the splicing chamber 17, the yarns have adequate room to move laterally. To assist in placing yarns A and B in the notches 16a and 16b, the upper outer edges of the notches may be filleted.

Figure 13:
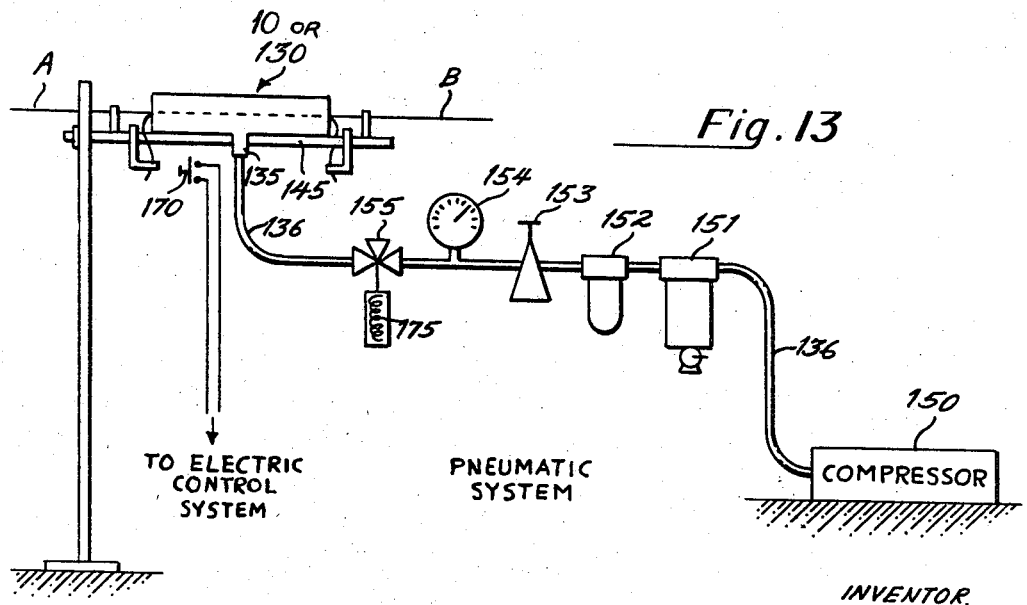
FIG. 13 is a schematic diagram of a suitable air supply for supplying compressed air to the splicing box.
Figure 14:
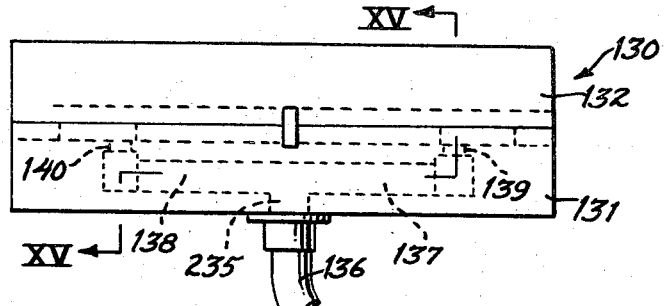
FIG. 14 is a side elevation of a modified splicing box in which halved yarn ends are stagger spliced together.

After inserting the yarns A and B, one on top of the other, as described above, the lid 12 is then closed and latched. FIG. 5 illustrates the positions, or approximate positions, of the yarns A and B as seen in cross-section at the center of the splicing chamber 17, after the lid 12 is closed but before the compressed air is applied. Pushbutton switch 170 of FIGS. 13 and 14 is then closed to energize the winding 175 and open the normally closed solenoid valve 155, thereby to apply compressed air through hose 136 and connector 135 to the air injection slot 18. The compressed air rushes up through the narrow slot 18 and a narrow shaft of air shoots up through the approximate vertical axial diameter of the superimposed yarns A and B, forcing the filaments of the yarns apart by a knifing or wedging force, as is illustrated diagrammatically in FIG. 6. The injected air then strikes the gasket 20 and rebounds therefrom downwardly. It then exhausts axially outwardly in both directions through the splicing chamber 17, through the escape holes 70 and 71 and through the notch portions 16a and 16b at the ends of the insert 15, as is illustrated diagrammatically by the arrows in FIG. 7 of the drawing. It is to be understood that the air flow arrows in FIGS. 6 and 7 represent generally what is believed to happen with respect to the flow of the injected air. There is considerable turbulence as the compressed air escapes axially outwardly in both directions.

Figure 9:
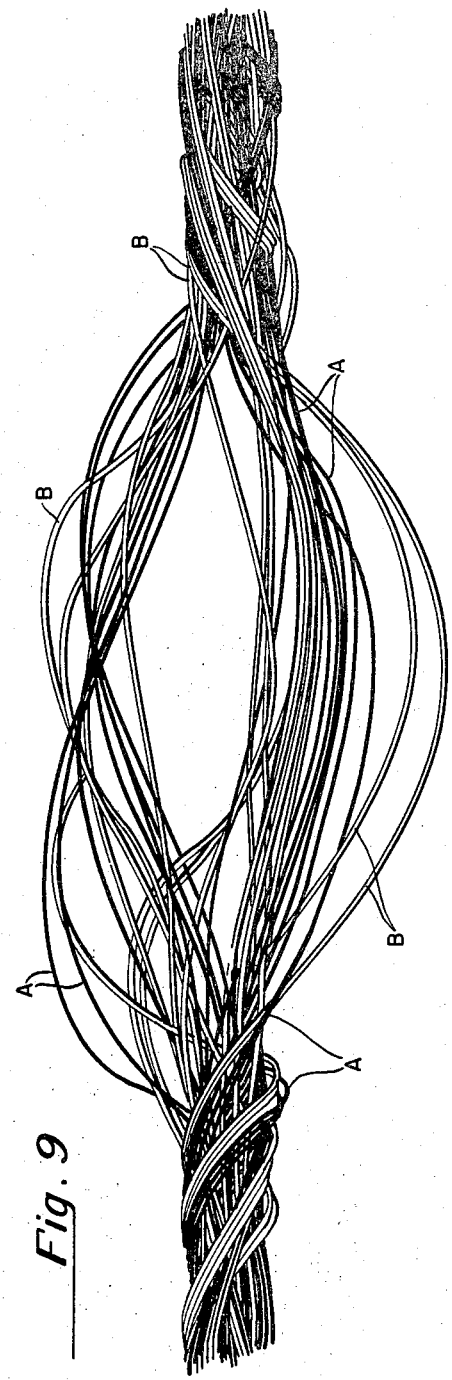
FIG. 9 is an enlarged schematic illustration of a typical splice produced by the method according to this invention.

It is believed that because the narrow shaft of compressed air knifes up through the superposed yarns A and B and spreads the filaments apart, as indicated diagrammatically in FIGS. 6 and 9, a sort of vortex is created at this point which sucks in at least some of the injected air as it rebounds from the gasket 20. This air, which is sucked in at the vortex then apparently swirls along the interior filaments of the yarns in both axial directions, until it exhausts from the chamber 17 either through the escape holes 70 and 71 or through the notches 16a and 16b. This swirling force, together with the force applied to the exterior yarn filaments by the air which passes outwardly about the exterior filaments of the yarns, causes the filaments of the two yarns A and B to become entangled and intertwined in a braid-like fashion.

Figure 8:
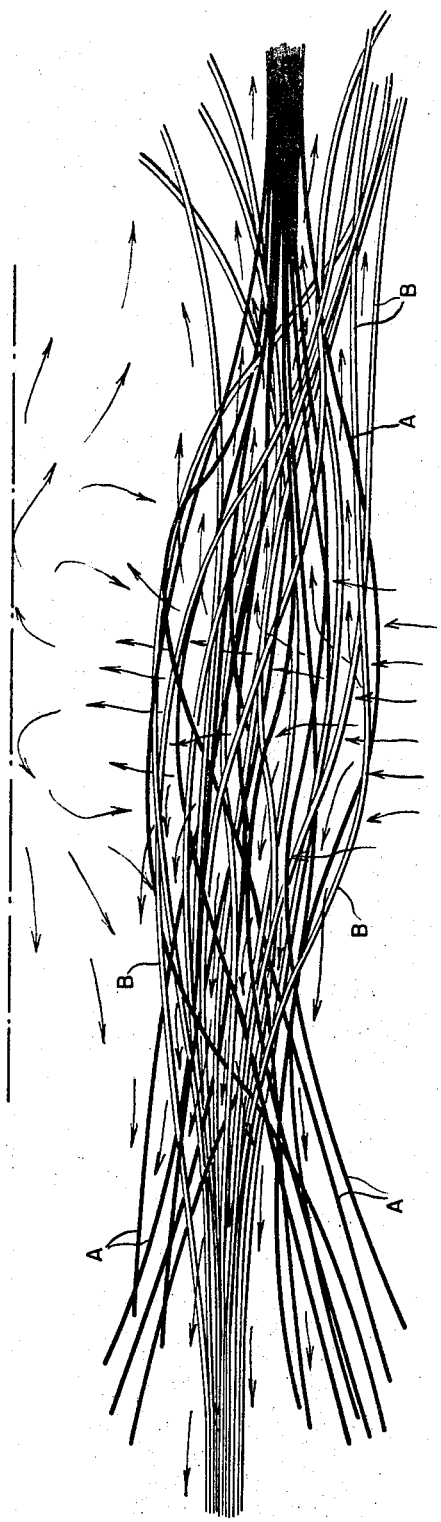
FIG. 8 is an enlarged schematic view showing a typical appearance of the filaments just after the air jet beings to flow through the filaments and turn in a generally axial direction, as seen looking along the line VIII—VIII of FIG. 6.

FIG. 8 is intended to illustrate the flutter and movement of the yarn filaments in the early stage of the air splice in the region of the vortex, as viewed from the side, looking along the line VIII—VIII of FIG. 6.

FIG. 9 is a plan illustration of the vortex and adjacent portions showing the intertwined braid-like yarns A and B at a later stage of the air spacing action. In FIG. 9, the yarns are shown to be more tightly intertwined than in FIG. 8. As appears in FIG. 9, each separate, intermediate group of filaments includes filaments of both yarns A and B.

It is deemed important to the present invention that the filaments of the two yarns be wedged apart, preferably along their axial center lines, by the narrow shaft of injected compressed air which knifes up through the filaments, as indicated diagrammatically in FIG. 6. This allows the injected air which rebounds from the gasket 20 to be drawn down into the opening between the filaments and to pass along the interior filaments as well as along the exterior filaments. This action plays an important part in the intermingling, entanglement and braiding of the filaments and a stronger splice is thus produced.

Tests have shown that the air splicing method described above produces a splice whose strength equals that of the yarn itself, and without increasing the diameter or denier of the spaced yarns at the splice to as great an extent as a manual or mechanical knot does. It has been found that yarns spliced by the method described above, when tested for breaking strength, will break away from the splice, and that the splice will not come apart. In a tested case, yarn spliced by the method described herein broke in an area spaced away from the splice at from 27 to 29 pounds pull, indicating that the splice was stronger than the yarn, whereas the same yarn knotted by a standard type of knot broke at the knot at from 17 to 25 pounds pull. The same yarn spliced by thermal splicing broke at from 5 to 12 pounds pull.

For best results, the compressed air (or other gas) supplied to the splicing box should be dry, that is, free of moisture and free of oil. A suitable system for supplying dry compressed air to the air injection slot of the splicing box is shown in FIG. 13. The system there shown includes an air compressor 150, an automatic drain air line filter 151, a particle filter 152, a pressure regulator 153, a pressure gauge 154, and a normally closed solenoid valve 155, connected in series by the air hose 136 to the input connector 135.

Experience has shown that the pressure may also be important to a successful splice. A yarn having a denier of 1½ per filament may, for example, require only 30 p.s.i. while a yarn of 18 denier per filament may require 90 p.s.i.

Figure 17:
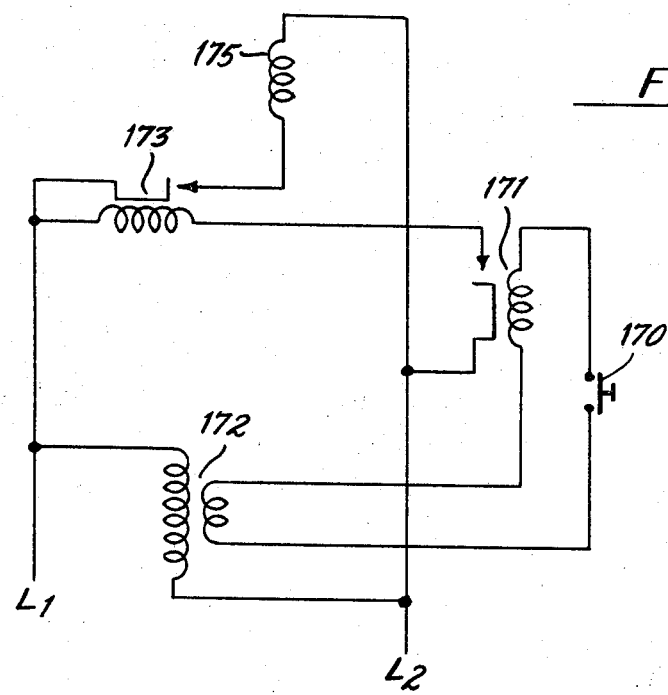
FIG. 17 is a schematic of the electric control system.

The duration of the blast of air may also be important to a successful splice. Accordingly, the system shown in FIG. 13 is controlled by an electric timer system shown in FIG. 17. In FIG. 17, a timing relay 173 controls the time period during which the solenoid valve 155 of FIG. 13 is open. When the pushbutton 170 of FIGS. 13 and 17 is depressed, the relay 171 is energized and its contacts close. This closes the circuit through the winding of the timing relay 173 and its contacts close. This energizes the winding 175 of the solenoid 155 and the solenoid valve 155 opens for a time period determined by the timing relay 172. Timing relay 172 may preferably be a style ACT relay of the Allen-Bradley Company, Milwaukee, Wis.

Figure 11:
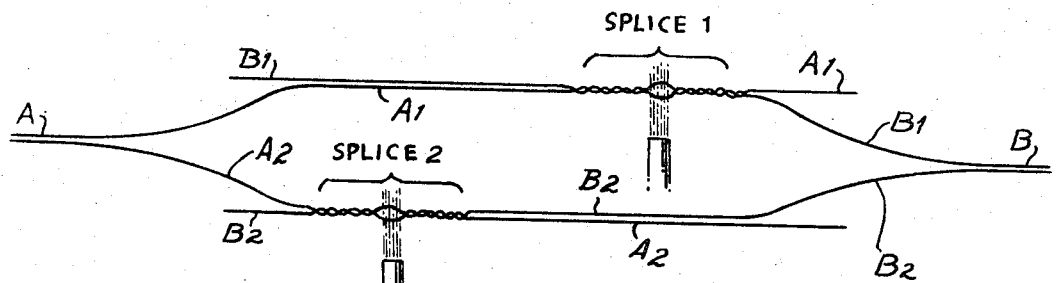
FIG. 11 is a schematic illustration showing the manner in which yarns may be halved and spliced at staggered locations.
Figure 12:
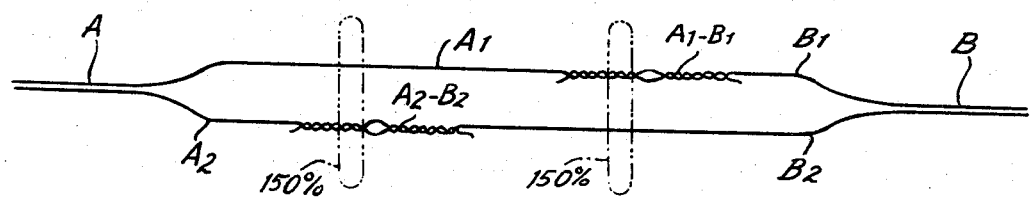
FIG. 12 is a schematic illustration showing the final stagger splice of the halved and stagger spliced yarns.

While the air splicing method thus far described provides a strong splice of sufficiently small outside diameter or denier to pass through the nip of feed rolls of crimpers or the like, it may be preferable, in the splicing of some yarns to use the stagger splice method illustrated diagrammatically in FIGS. 11 and 12. Yarn A extends to the left of the drawing for an indefinite distance, while yarn B extends to the right of the drawing for an indefinite distance. At a point located to the left of the splicing zone, as viewed in FIG. 11, yarn A is divided manually by the operator into approximately two half portions, identified as A1 and A2. Similarly, at a point located to the right of the splicing zone, yarn B is divided into approximately two half portions, B1 and B2. The half portions A1 and B1 of the two yarns are placed together in superposed overlapping relation, in one passage of a double passage splicing box, and, similarly, the two half portions A2 and B2 are placed together in superposed overlapping relation in the other passage of the double passage splicing box. One form of suitable double passage splicing box is illustrated in FIGS. 14–16 and 20, later described. Referring again to FIG. 11, in the region marked splice 1, the yarn halves A1 and B1 are subjected to a narrow shaft of injected compressed air, in a manner similar to that previously described with respect to FIGS. 1–9, and the individual filaments of A1 and B1 in this region become entangled and intermingled, and a splice is thus formed. Similarly, in the region marked splice 2, which is offset axially along the yarn from splice 1, the two half portions A2 and B2 are subjected to a shaft of compressed air and the individual filaments A2 and B2 become entangled and intertwined and a splice is formed.

The result of the foregoing operation is shown diagrammatically in FIG. 12, which brings out that when the yarns A and B are stagger spliced, by the method and apparatus herein described, the maximum denier at each splice is only 150% of the denier of one of the yarns. These splices have been found to be sufficiently small in cross-section to pass through the nip of the feed rolls of crimpers or the like, and to pass through reeds, combs, tubes, the eyes of needles, and the like.

Figure 15:
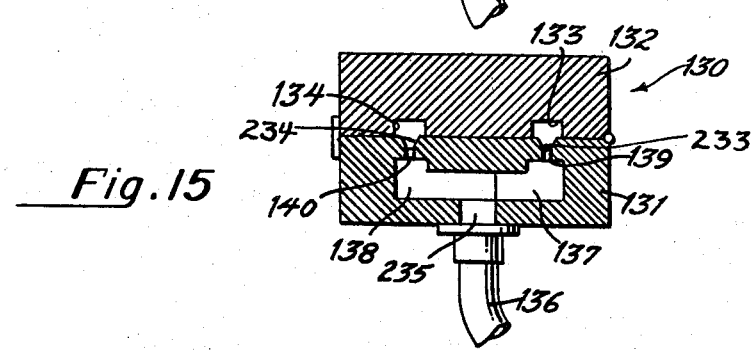
FIG. 15 is a sectional view along the line XV—XV of FIG. 14.
Figure 16:
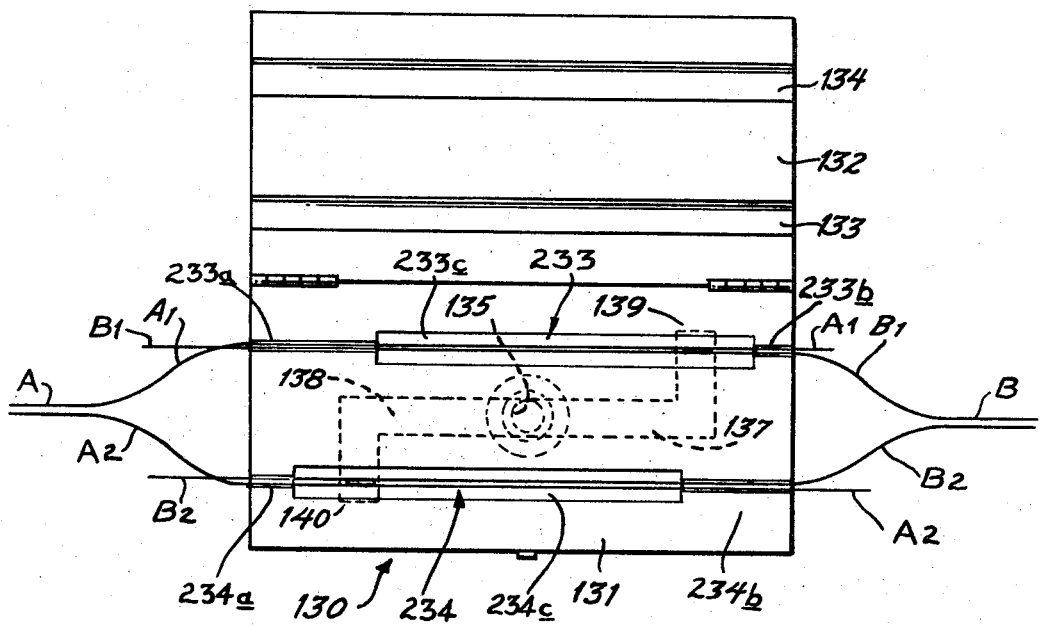
FIG. 16 is a top plan view of the splicing box of FIGS. 14 and 15 showing the box open and the halved yarn ends lying in the splicing troughs.

FIGS. 14, 15 and 16 illustrate diagrammatically a suitable splicing box 130 for making the staggered splices illustrated in FIGS. 11 and 12. The box 130 may be generally similar to the splicing box 10, previously described in connection with FIGS. 1–7, but differs therefrom primarily in that it has two passages disposed in parallel relation.

In the form illustrated in FIGS. 14–16, the base of splicing box 130 is provided with a pair of parallel grooves 233 and 234 and the lid 132 contains a pair of parallel grooves 133 and 134. The center axes of the grooves 233 and 234 in the base coincide respectively with those of the center axes of the grooves 133 and 134 in the lid so that when the lid 132 is closed upon the base 131, open ended passages are formed in the splicing box 130.

Each of the grooves 233 and 234 in the base 131 is characterized by having a narrow rectangular notch at each end and a splicing chamber of larger cross-sectional area therebetween. In FIGS. 14–16, the groove 233 in the base, which mates with groove 133 in the lid, is comprised of the rectangular notches 233a and 233b at each end and splicing chamber 233c therebetween. The other groove 234 in the base, which mates with groove 134 in the lid, is comprised of the rectangular notches 234a and 234b at the ends and splicing chamber 234c therebetween. The air hose 136 is connected to the input opening 235 in the center of the base 131, and the input opening 135 communicates with passages 137 and 138 which extend axially in both directions from the input port. Passages 137 and 138, after running axially in opposite directions, then turn and run laterally in opposite directions, terminating in the narrow air injection slots 139 and 140 which communicate with the splicing chambers 233c and 234c, respectively.

Although not shown in the diagrammatic illustrations of FIGS. 14–16, the undersurface of the lid 132, and/or the upper surface of the base 131 of splicing box 130 may be provided with a sealing gasket of suitable material.

In FIGS. 14–16, the splicing chambers 233c and 234c are illustrated as being of V-shape cross-section, while grooves 133 and 134 in the lid are illustrated as being of rectangular cross-section. It is to be understood, however, that other cross-sectional shapes may be used. It is also to be understood that the construction illustrated in FIGS. 14–16 is a modification of that shown in FIGS. 1–7, and that the construction of the notches and splicing chambers in the double passage splicing box 130 may be similar to that used in the single passage splicing box 10 of FIGS. 1–7.

Also, in FIGS. 14–16, the air injector slots 139 and 140 are illustrated as being off-center relative to the splicing chambers 233c and 234c. The notches 233a and 234b may, however, be increased in length to shorten the splicing chambers to center the air injection slots.

Figure 18:
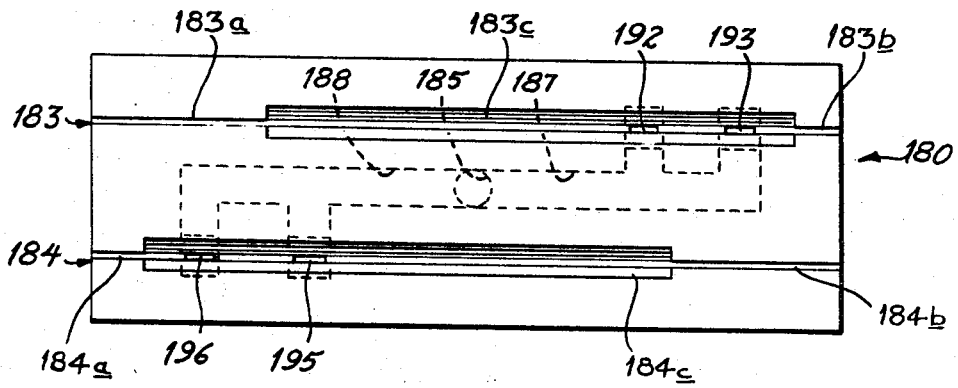
FIG. 18 is a diagrammatic illustration of a modified splicing box having four discharge slots.

Two or more air injection slots may be used in series in some cases, either in the single passage box of FIGS. 1–7 and 20 or in the double passage box of FIGS. 14–16. In FIG. 18, a double passage splicing box 180 is illustrated in which each passage is provided with two air injection slots. In FIG. 18 only the base portion of box is shown, having therein grooves 183 and 184. Groove 183 comprises end notches 183a and 183b and splicing chamber 183c. Groove 184 comprises end notches 184a and 184b and splicing chamber 184c. The air input port 185 communicates with channels 187 and 188 which extend axially in opposite directions from the central input port 185. Channel 187 then extends laterally at two points and connects with the narrow air injection slots 192 and 193 which communicates with the splicing chamber 183c. Channel 188 extends laterally at two points in the opposite lateral direction and connects with the air injection slots 195 and 196 which communicate with splicing chamber 184c of groove 184.

Splices may be formed in spun yarns as well as continuous filament yarns according to this invention, which is particularly suitable for the splicing of synthetic continuous filament yarns, including nylon and rayon, and may be used to particular advantage in the production of cord fabric in tire manufacture. Heretofore, in the manufacture of nylon cord tires, when manually knotted splices are used, the knotted portion of the nylon yarn, when embedded in the rubber and subject to excessive load, has been prone to frequent breaking in those portions that have been knotted because of the shearing action on the knot itself. The new splice of the present invention, embedded in rubber permits no shearing action, yet the rubber prevents the spliced and braided filaments from slipping apart. As a consequence, the new splice is especially useful when embedded in rubber, as in tires or in industrial hoses.

FIG. 10 illustrates a tire 60 with the rubber 61 broken away to reveal the cord 62 having a number of splices 63 indicated by the black indications, these splices having been made by the method and apparatus of the present application.

The present application describes a novel, stronger splice. The new splice can be recognized by its peculiar characteristic of having filaments of one of the yarns entangled with those of the other on both axial sides of an intermediate air injection point, the filaments being wedged apart at said injection point and the yarn splice being of larger denier thereat due to the looseness of the filaments, as illustrated schematically in FIG. 9. By so locating the end portions of the yarns $a'$ and $b'$ within the chamber 17, as indicated in FIGS. 19 and 20, instead of extending endwise beyond the chamber 17 as in FIG. 1, a preferred splice is produced because the twisting or braiding occurs substantially all the way to the end portion of each filament, eliminating any need for trimming. The spliced product is shown in FIG. 21, showing how the end portions of the filaments are completely twisted or braided into the yarns $y, y$ themselves, and are thereby integrated into the splice. In each zone of entanglement, substantial numbers of the filaments of the terminal portions of both yarns are tucked into the zone of entanglement.

FIG. 19 shows vertically arranged clamps 300, 300 and FIG. 20 shows horizontally arranged clamps 301, 301 for holding the yarns, freeing the hands of the operator for other duties. The clamps do not apply any tension to either yarn because the end portions of both yarns to be spliced are unclamped and freely disposed within the chamber.

Splices according to this invention have been found to have superior breaking characteristics and special advantages. As already indicated, the new splices enable the joined ends to pass through the nip of feed or crimp rolls and through reeds, combs, eyes, and the like. This enables the processing of yarn on a continuous basis. They are much stronger than knots or prior splices, and when made according to FIGS. 19, 20 and 21 require no trimming of overlapping portions, thereby sharply reducing the splicing time required.

While the preferred embodiments of this invention have been described in some detail, it will be obvious to one skilled in the art that various modifications may be made without departing from the invention as hereinafter claimed.

The following is claimed:

1. A splice joining a plurality of multi-filament yarns comprising a portion in which filaments of the yarn form groups that are wedged apart from each other, and in which the filaments form zones of entanglement which extend in both axial directions from said portion.

2. A splice as claimed in claim 1 characterized in that there are a plurality of said portions.

3. The splice defined in claim 1, wherein the filaments of each said group include filaments from each of said plurality of multi-filament yarns.

4. The splice defined in claim 1, wherein in each said zone of entanglement substantial numbers of the terminal portion of each of said plurality of yarn are tucked into the zone of entanglement.

5. In a method of splicing a plurality of multi-filament yarns, the steps which comprise laying yarns closely adjacent one another in a chamber, each yarn having one portion fixed and its end portion free within said chamber, said end portions being spaced longitudinally from each other and wedging a stream of gas into said chamber through a portion of said yarns intermediate their end portions, and longitudinally along said yarns, whereby zones of entanglement are formed into which said end portions are tucked.

6. A tire having a cord fabric in which a plurality of multifilament yarn ends are spliced together by a splice which is characterized by filaments of one yarn being entangled with those of another yarn throughout an axial overlapping length except that at intermediate point or points in said overlapping length the filaments are wedged apart.

References Cited

UNITED STATES PATENTS

| | | | |
|---|---|---|---|
| 3,110,151 | 11/1963 | Bunting et al. | 28—72 XR |
| 3,262,179 | 7/1966 | Sparling | 28—1 |
| 3,273,330 | 9/1966 | Gonsalves. | |
| 3,274,764 | 9/1966 | Gonsalves | 57—142 |
| 3,286,321 | 11/1966 | Fletcher et al. | 28—72 |
| 3,306,020 | 2/1967 | Rosenstein | 57—22 |
| 3,315,458 | 4/1967 | Alexander | 57—22 XR |
| 3,339,362 | 9/1967 | Dodson et al. | 57—159 |

FOREIGN PATENTS

| | | |
|---|---|---|
| 956,992 | 4/1964 | Great Britain. |

FRANK J. COHEN, *Primary Examiner.*

D. WATKINS, *Assistant Examiner.*